United States Patent
Hessler et al.

(12) United States Patent (10) Patent No.: US 11,063,715 B2
(45) Date of Patent: Jul. 13, 2021

(54) MULTI NUMEROLOGY TRANSMISSION METHOD FOR A RADIO COMMUNICATION SYSTEM

(71) Applicant: Telefonaktiebolaget LM Ericsson (publ), Stockholm (SE)

(72) Inventors: Martin Hessler, Linköping (SE); Mattias Frenne, Uppsala (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 341 days.

(21) Appl. No.: 16/081,061

(22) PCT Filed: Feb. 26, 2018

(86) PCT No.: PCT/SE2018/050180
§ 371 (c)(1),
(2) Date: Aug. 30, 2018

(87) PCT Pub. No.: WO2018/182477
PCT Pub. Date: Oct. 4, 2018

(65) Prior Publication Data
US 2020/0351044 A1    Nov. 5, 2020

Related U.S. Application Data

(60) Provisional application No. 62/478,084, filed on Mar. 29, 2017.

(51) Int. Cl.
*H04W 4/00* (2018.01)
*H04L 5/00* (2006.01)
*H04L 27/26* (2006.01)
(52) U.S. Cl.
CPC ........ *H04L 5/0048* (2013.01); *H04L 5/0092* (2013.01); *H04L 27/2602* (2013.01)

(58) Field of Classification Search
CPC . H04L 5/0048; H04L 5/0092; H04L 27/2602; H04L 27/2613; H04L 25/022
See application file for complete search history.

(56) References Cited

U.S. PATENT DOCUMENTS

2016/0352551 A1* 12/2016 Zhang ................. H04L 27/2646
2016/0353476 A1* 12/2016 Sartori ................. H04L 5/0092
(Continued)

FOREIGN PATENT DOCUMENTS

KR    20120023004 A    3/2012

OTHER PUBLICATIONS

"CSI acquisition for mixed numerology", 3GPP TSG-RAN WG1 Meeting #88bis; Rt-1705940; Spokane, USA, Apr. 3-7, 2017, pp. 1-4.
(Continued)

*Primary Examiner* — Abdelnabi O Musa
(74) *Attorney, Agent, or Firm* — Sage Patent Group (57) ABSTRACT

A first network node (200), a wireless device (202) and methods therein, for radio communication. The first network node determines first (2:1) and second (2:3) numerologies for communication of a reference signal and data, respectively, the first and second numerologies defining different combinations of subcarrier spacing and time between two successive OFDM symbols. The first network node then configures (2:4) the wireless device with the first and second numerologies and transmits (2:5) an assignment of data in the second numerology to the wireless device, the assignment comprising a trigger for the reference signal. Thereby, the first network node and the wireless device can communicate (2:6) the reference signal using the first numerology, and communicate (2:7) the data using the second numerology.

20 Claims, 5 Drawing Sheets (56) References Cited

U.S. PATENT DOCUMENTS

2017/0353256 A1* 12/2017 Islam .................... H04L 25/022
2018/0007673 A1*  1/2018 Fwu ...................... H04L 5/0037
2018/0110019 A1*  4/2018 Ly ........................ H04W 56/001
2019/0363777 A1* 11/2019 Karjalainen ......... H01Q 3/2605

OTHER PUBLICATIONS

"Overview on NR MIMO for above 6 GHz", 3GPP TSG RAN WG1 Meeting #85; R1-164295; Nanjing, China, May 23-27, 2016, pp. 1-7.

"Subcarrier spacing design for data and reference signal", 3GPP TSG RAN WG1 Meeting #86; R1-166609; Gothenburg, Sweden, Aug. 22-26, 2016, pp. 1-7.

First Examination Report dated Jan. 29, 2021 for Indian Patent Application No. 201817042662, 6 pages.

* cited by examiner

Fig. 8

MULTI NUMEROLOGY TRANSMISSION METHOD FOR A RADIO COMMUNICATION SYSTEM

TECHNICAL FIELD

The present disclosure relates generally to a first network node, a wireless device and methods therein, for radio communication between the first network node and the wireless device.

BACKGROUND

In this disclosure, the term "wireless device" is used to represent any communication entity capable of radio communication with a wireless network by sending and receiving radio signals, such as e.g. mobile telephones, tablets, laptop computers and Machine-to-Machine, M2M, devices, also known as Machine Type Communication, MTC, devices. Another common generic term in this field is "User Equipment, UE" which is frequently used herein as a synonym for wireless device.

Further, the term "network node", is used herein to represent any node of a wireless network that is operative to communicate radio signals with wireless devices. The network node in this disclosure may refer to a base station, radio node, Node B, eNB, base transceiver station, access point, etc., although this disclosure is not limited to these examples. The network node in this disclosure may also refer to a node in the wireless network, such as a Radio Network Controller, RNC, that controls one or more base stations or radio nodes that communicate radio signals with wireless devices. The term "base station" or BS is frequently used herein to represent such a network node.

In order to achieve adequate signal reception as well as to evaluate whether a connection to a network node is suitable for communication and to configure various parameters for the communication, wireless devices are requested to transmit reference signals to enable network nodes to perform measurements on the reference signals, and/or to perform measurements themselves on predefined reference signals which are regularly transmitted from network nodes. In this disclosure, the term "measurements" may, without limitation, refer to measurements of signal strength and/or quality of a received signal. Further, "a reference signal" as used throughout this disclosure should be understood as at least one reference signal.

This disclosure may be applied to a wireless network where signals are communicated using Orthogonal Frequency-Division Multiplexing, OFDM. For example, the wireless network may be operating according to Long Term Evolution, LTE, as defined by the third Generation Partnership Project, 3GPP, or according to 5G.

SUMMARY

It is an object of embodiments described herein to address some problems and issues that are discussed herein. It is possible to achieve this object and others by using a first network node, a wireless device and methods therein, as defined in the attached independent claims.

According to one aspect, a method is performed by a first network node for radio communication with a wireless device. In this method, the first network node determines a first numerology for communication of a reference signal with the wireless device, where the first numerology defines a first combination of subcarrier spacing and time between two successive Orthogonal Frequency-Division Multiplexing, OFDM, symbols. The first network node also determines a second numerology for communication of data between the first network node and the wireless device, where the second numerology defines a second combination of subcarrier spacing and time between two successive OFDM symbols.

The first network node further configures the wireless device with the first and second numerologies where the reference signal is associated with the first numerology. The first network node then transmits an assignment of data in the second numerology to the wireless device, the assignment comprising a trigger for the reference signal. Thereby, the first network node and the wireless device can communicate the reference signal using the first numerology, and communicate the data using the second numerology, whenever needed. In the case of downlink transmissions, the wireless device is able to measure the reference signal and receive the data according to the configured first and second numerologies, respectively. In the case of uplink transmissions, the wireless device will transmit the reference signal and the data according to the configured first and second numerologies, respectively.

According to another aspect, a first network node is arranged for radio communication with a wireless device. The first network node is configured or operable to determine a first numerology for communication of a reference signal with the wireless device, the first numerology defining a first combination of subcarrier spacing and time between two successive OFDM symbols. The first network node is further configured or operable to determine a second numerology for communication of data between the first network node and the wireless device, the second numerology defining a second combination of subcarrier spacing and time between two successive OFDM symbols. The above determining operations may be performed by a determining module in the first network node.

The first network node is further configured or operable to configure the wireless device with the first and second numerologies where the reference signal is associated with the first numerology, which may be performed by a configuring module in the first network node. The first network node is also configured or operable to transmit an assignment of data in the second numerology to the wireless device, the assignment comprising a trigger for the reference signal, which may be performed by a transmitting module in the first network node.

According to another aspect, a method is performed by a wireless device for radio communication with a first network node, such as the above-mentioned first network node. In this method, the wireless device receives from the first network node a configuration of a first numerology for communication of a reference signal, where the first numerology defines a first combination of subcarrier spacing and time between two successive OFDM symbols. The wireless device also receives from the first network node a configuration of a second numerology for communication of data between the first network node and the wireless device, where the second numerology defines a second combination of subcarrier spacing and time between two successive OFDM symbols.

The wireless device further receives from the first network node an assignment of data in the second numerology, the assignment comprising a trigger for the reference signal.

According to another aspect, a wireless device is arranged for radio communication with a first network node. The wireless device is configured or operable to receive from the first network node a configuration of a first numerology for communication of a reference signal, the first numerology defining a first combination of subcarrier spacing and time between two successive OFDM symbols, which may be performed by a first receiving module in the first network node.

The wireless device is also configured or operable to receive from the first network node a configuration of a second numerology for communication of data between the first network node and the wireless device, the second numerology defining a second combination of subcarrier spacing and time between two successive OFDM symbols, which may be performed by a second receiving module in the first network node.

The wireless device is also configured or operable to receive from the first network node an assignment of data in the second numerology, the assignment comprising a trigger for the reference signal, which may be performed by a third receiving module in the first network node.

The above methods, first network node and wireless device may be configured and implemented according to different optional embodiments to accomplish further features and benefits, to be described below.

A computer program is also provided comprising instructions which, when executed on at least one computer in either of the first network node and the wireless device, cause the at least one computer to carry out the respective methods described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

The examples and embodiments described herein may be used in a procedure for radio communication between a first network node and a wireless device, which involves usage of different numerologies for communication of reference signal and data, respectively. In this description, "communication" may refer to both uplink and downlink communication, i.e. the term "communicate" is to be understood as either transmit or receive a reference signal and/or data, as described herein. Hence, the embodiments described herein are applicable for communication on both the uplink UL and the downlink DL. Further, the term "a reference signal" should in this description be understood as at least one reference signal.

First, the term "numerology" will be explained in more detail below. In this technical field, numerology is basically related to the configuration of an OFDM based radio interface, including subcarrier spacing and time between two successive Orthogonal Frequency-Division Multiplexing, OFDM, symbols. Subcarrier spacing refers to the difference in frequency between two adjacent subcarriers.

In many wireless communications systems, CSI (Channel-State Information) feedback is utilized for obtaining good performance. Typically, DL reference signals are transmitted from a network node and the DL reference signals are measured and used by a wireless device or UE to estimate the channel state, which the UE reports as CSI feedback to the network node. For example, the reported CSI feedback typically includes CQI (Channel-Quality Indicator), RI (Rank Indicator), and PMI (Pre-coding Matrix Indicator) values.

The 3GPP LTE (Long Term Evolution) system supports CSI-reporting schemes that rely on the DL reference signals, also referred to as reference symbols, being transmitted periodically; in LTE the cell-specific reference symbols (CRS) are sent every sub-frame while the user-specific CSI-RS can be sent with a larger periodicity, i.e. more seldom. UEs using transmission mode 10 (TM10) rely solely on CSI-RS resources while other UEs typically use the CRS resources at least for interference measurements. In the field of wireless communication, a wireless device or UE is commonly referred to as a "user" for short which term is sometimes used herein to represent a wireless device.

Figure 1:
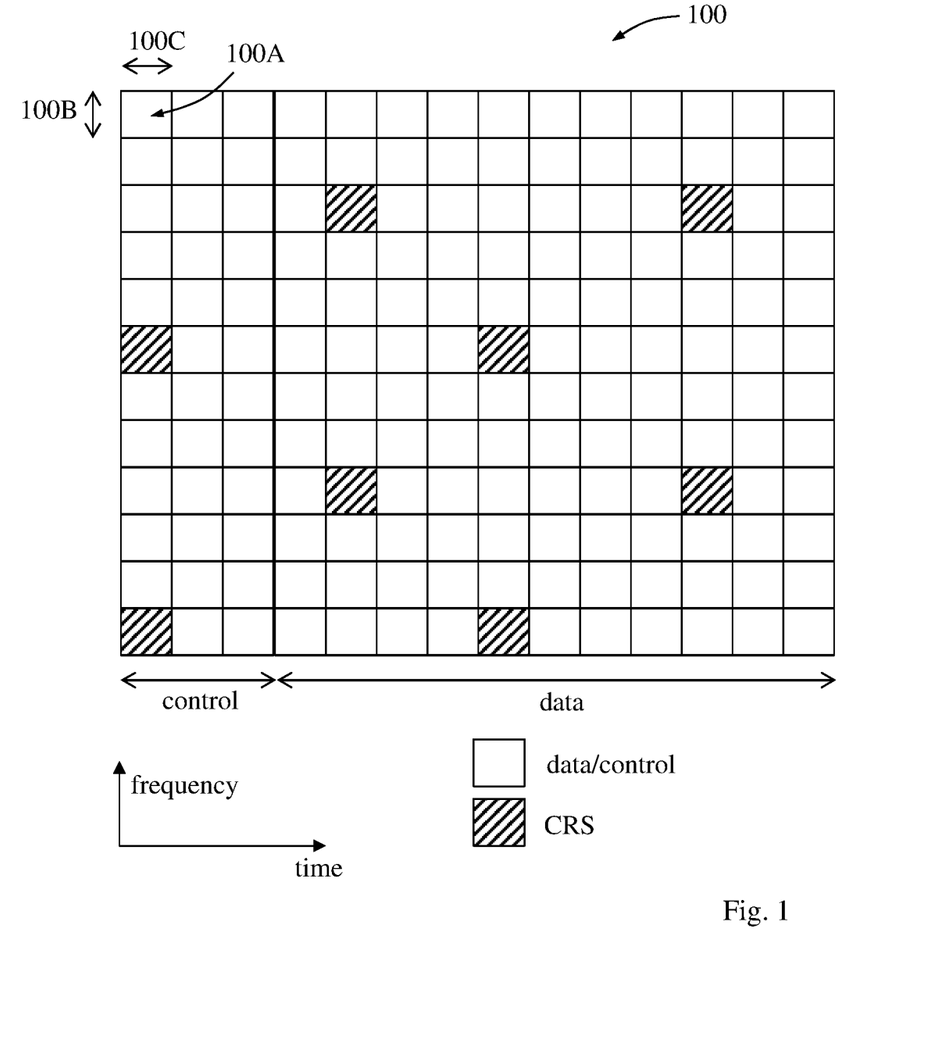
FIG. 1 is a diagram illustrating a downlink resource block configured with cell-specific reference symbols, CRS.

An example of how a downlink resource block may be configured with CRS is illustrated in FIG. 1. One resource block 100 may extend over 180 kHz in frequency domain during 1 millisecond, ms, in time domain. The resource block 100 can be further divided into 12 subcarriers in the frequency domain and into 14 OFDM symbols in the time domain, as shown in FIG. 1. The resource block 100 in FIG. 1 is thus effectively a "resource grid" divided into 12 elements in the frequency domain representing the above 12 subcarriers and 14 elements in the time domain representing the above 14 OFDM symbols. In this example, the smallest resource in the resource block 100 is comprised of one Resource Element, RE, 100A which corresponds to the frequency spectrum allocated for one subcarrier 100B during one OFDM symbol 100C. As mentioned above, the difference between any two adjacent or contiguous subcarriers in the frequency domain is generally referred to as the subcarrier spacing.

For uplink CSI, a UE may be configured with Sounding Reference Signals, herein referred to as "SRS" for short, that may be transmitted by the UE periodically or on-demand so that they may be received by the network node, e.g. an eNB, for enabling the network node to perform CSI estimation based on measurements of the received SRS. In a TDD (Time-Division Duplex) wherein full channel reciprocity may be obtainable, the SRS may be used to obtain both downlink and uplink CSI.

Figure 1A:
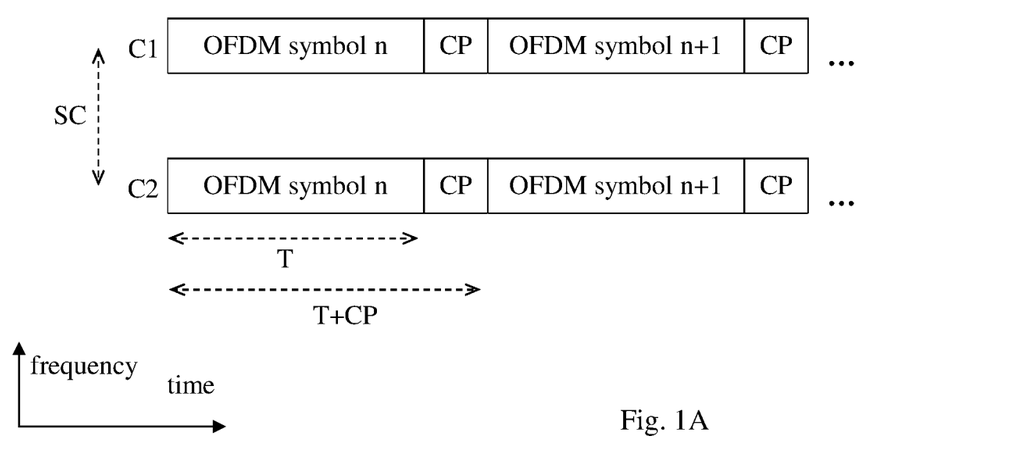
FIG. 1A is a diagram illustrating timing and sub-carrier spacing of two adjacent subcarriers C1 and C2.

In 5G and LTE systems, there is support for a number of numerologies, where a numerology is a supported configuration of an OFDM based radio interface, as mentioned above. The difference between 5G and LTE is however that 5G is expected to operate using a mix of different numerologies simultaneously while in LTE system only a single numerology is used during operation. In OFDM there is a fixed relation between the sub-carrier spacing frequency, here denoted SC, and the OFDM symbol duration in time, T, such that SC*T is constant. On top of this relation there is an additional time duration for the cyclic prefix, CP, so that the total time between two consecutive OFDM symbols thus constitutes both T and CP. The above-described timings and sub-carrier spacing SC of two adjacent subcarriers C1 and C2 are schematically illustrated in FIG. 1A.

Hence, if CP is kept fixed the overhead or contribution from the cyclic prefix is increased when the time T is made shorter. Therefore, the current assumption is that when the sub-carrier spacing SC is increased with a factor 2 the time T is made half as long but also the CP is made half as long. This implies that when "going up" in numerology, i.e. increasing the subcarrier spacing SC and reducing the time T, the cyclic prefix becomes shorter which implies that the margin for delay spread and propagation delay decreases when going up in numerology. It can thus be assumed that a higher numerology is less robust than a lower numerology and therefore requires more favourable propagation properties or radio conditions.

Potential Problems

In future wireless systems, it can be assumed that the network will support a larger set of numerologies, i.e. different options for the sub-carrier spacing. Hence, when sites, i.e. network nodes, are dynamically assigning the "best" or most suitable numerology on a per user, i.e. UE, basis, it may happen that different users in different sites can be using different numerologies for data transmissions in the same Transmission Time Interval, TTI. This may be problematic if two neighboring network nodes (base stations) are going to receive an UL measurement signal, for example a UL based mobility signal, transmitted by a UE in each cell served by the network nodes. If the two numerologies are not matched, the measurement signals from the UEs will not in general be orthogonal nor be possible to receive with the same receiver settings.

In this description, the term "site" is used to represent a network node at a certain location. For example, a reference signal transmitted by a wireless device may be received and measured at two or more sites, i.e. by two or more network nodes at their respective geographically separated locations.

It should be further noted that even in the case when it is desirable that both network nodes use the same scaled numerology with a shorted or reduced CP, certain problems may occur. For example, in case of UEs being assigned a numerology with a relatively short CP duration due to favorable propagation properties, it may be problematic for the UEs to perform measurements on reference signals towards a neighbor node if the propagation properties are worse and/or if there is a significant propagation delay in relation to the short cyclic prefix duration in the scaled numerology.

Also for downlink transmission, the above-described problem may occur. A UE may be connected to two network nodes at the same time wherein a first numerology is preferable to use for transmitting downlink data to the UE from a first network node, while a second numerology is preferred for transmitting downlink data to the UE from a second network node. To obtain improved performance, the UE can transmit and/or receive data to/from both of the two network nodes which is sometimes referred to as dual connectivity. This means that both network nodes need to transmit reference signals for CSI in the same numerology that is used for transmitting data to the UE. Hence, there are multiple UEs using different numerologies for data, each of the two network nodes needs to transmit reference signals for CSI in each of the different numerologies used for communicating data with UEs connected to the network nodes.

Possible Solution

A possible solution that may solve or at least reduce the above problems is that a wireless device is configured to communicate, i.e. transmit/receive reference signals to/from neighbor nodes in a first numerology independently from a second numerology the wireless device is using for data communication, i.e. transmissions/receptions. The first numerology is then, for example in UL, configured to support a larger delay-spread and an additional propagation delay that may be experienced in inter-site UL measurements. Further, said first numerology may be jointly configured in both a first base station and a second base station to enable simultaneous measurement in-between the pair of base stations.

An advantage of such a solution may be that reference signal measurements can be performed more efficiently in a mixed numerology scenario. For example, this may enable UL based mobility and inter-cell interference coordination in a single numerology without losing freedom in the choice of numerology for data, e.g. to support different service requirements such as low-latency services and/or to adapt the numerology to current radio conditions and traffic load.

Figure 2:
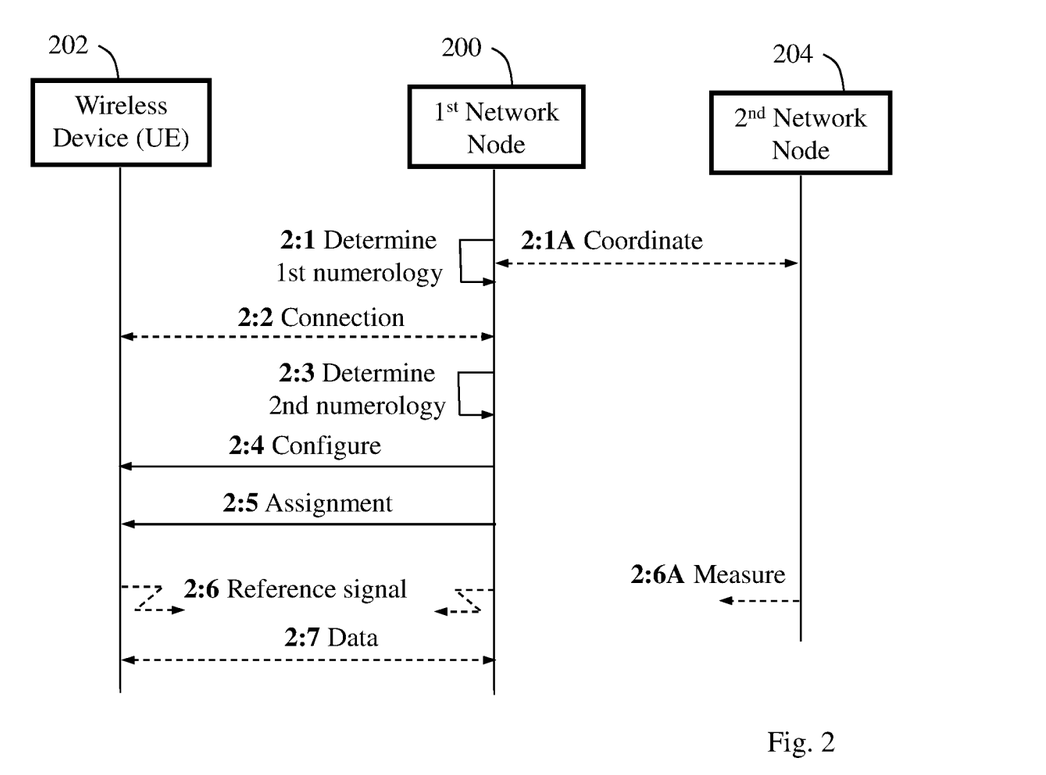
FIG. 2 is a signalling diagram illustrating an example of a procedure when the solution is used, according to some possible embodiments.

A communication scenario where the solution is employed is illustrated in FIG. 2 involving a first network node 200 of a wireless network and a wireless device 202 served by the first network node 200, which may communicate with each other over a wireless communication link. FIG. 2 is described below together with FIGS. 3 and 4. The network node may be a base station or a radio network controller, RNS that controls one or more base stations. Throughout this description, the wireless device 202 may e.g. be called a UE and the network node 200 may e.g. be called a base station or eNB.

Figure 3:
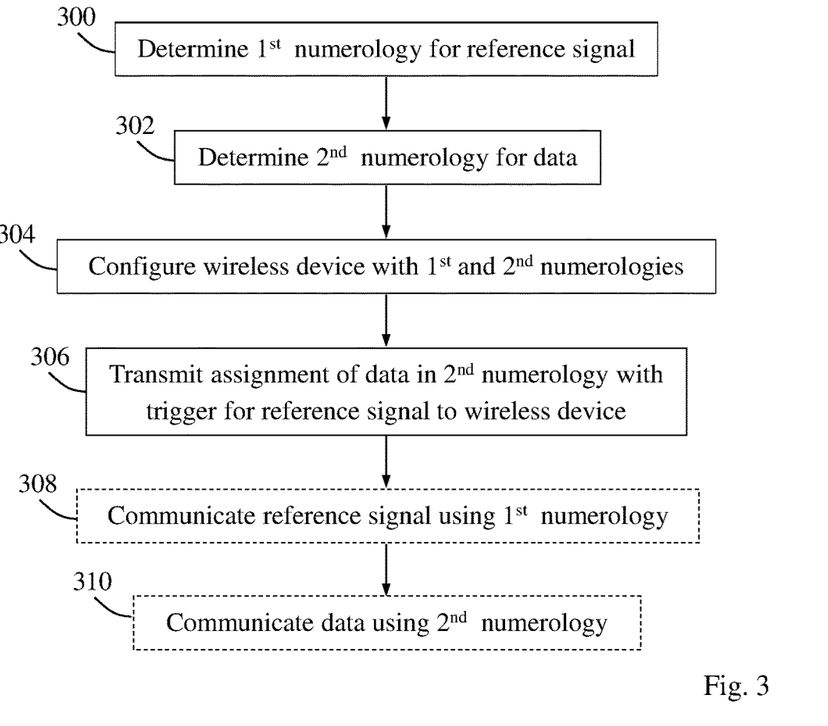
FIG. 3 is a flow chart illustrating a procedure in a network node, according to further possible embodiments.

An example of how the solution may be employed in terms of actions performed by a first network node such as the first network node 200, is illustrated by the flow chart in FIG. 3 which will now be described with further reference to FIG. 2. FIG. 3 thus illustrates a procedure in the first network node 200 for radio communication with the wireless device 202. Some optional example embodiments that could be used in this procedure will also be described.

A first action 300 illustrates that the first network node 200 determines a first numerology for communication of a reference signal with the wireless device 202, the first numerology defining a first combination of subcarrier spacing and time between two successive Orthogonal Frequency-Division Multiplexing, OFDM, symbols. This action is also illustrated in action 2:1 of FIG. 2. Optionally in this action, the first network node 200 may coordinate the first numerology with at least one second neighbouring second network node 204, as indicated by an additional action 2:1A in FIG. 2, which means that the network nodes 200 and 204 may use the same numerology for communication of the reference signal to facilitate measurements of the reference signal.

At some point during this procedure, a connection may be established between the wireless device 202, which is schematically illustrated as an action 2:2 in FIG. 2 which may alternatively take place prior to action 2:1 or at any point prior to the forthcoming action 2:4. In another action 302, the first network node 200 further determines a second numerology for communication of data between the first network node 200 and the wireless device 202, the second numerology defining a second combination of subcarrier spacing and time between two successive OFDM symbols, as also shown in action 2:3 of FIG. 2.

The first network node 200 further configures the wireless device 202 with the first and second numerologies where the reference signal is associated with the first numerology, in another action 304 which is also illustrated in action 2:4 of FIG. 2. This configuring action may be performed by basically instructing, through suitable signalling, the wireless device 202 to apply the first numerology when transmitting or receiving reference signals and to apply the second numerology when transmitting or receiving data.

A further action 306 illustrates that the first network node 200 transmits an assignment of data in the second numerology to the wireless device 202, the assignment comprising a trigger for the reference signal. The trigger basically instructs the wireless device 202 to use the reference signal, i.e. either transmit or receive the reference signal, according to the first numerology.

Another action 308 illustrates that the first network node 200 may communicate the reference signal using the first numerology, as also shown as an action 2:6 of FIG. 2. For example, the reference signal may in this action be transmitted by the wireless device 202, i.e. uplink transmission, and the transmitted reference signal may in this case be measured by the first network node 200 and also by the neighbouring second network node 204 as shown by another action 2:6A of FIG. 2. Another option for action 2:6 is that the reference signal is transmitted by the first network node 200, i.e. downlink transmission, so that it can be received and measured by the wireless device 202 and/or by another wireless device (not shown) connected to the second network node 204.

Another action 310 illustrates that the first network node 200 may further communicate the data with the wireless device 202 using the second numerology, which is also illustrated in action 2:7 of FIG. 2. Similar to action 308, the data may in action 310 be either transmitted by the wireless device 202 in an uplink transmission or by the first network node 200 in a downlink transmission. Some examples of how the above procedure may be implemented in practice will now be described.

It was mentioned above that the first numerology for the reference signal may be coordinated with at least one second neighbouring second network node 204. In one example, the first network node 200 may thus determine and use the first numerology jointly with at least one neighbouring second network node 204 for communication of the reference signal, thereby enabling and/or facilitating measurements of the reference signal across the first and second network nodes or across cells served by the first and second network nodes. Even though just one neighbouring network node 204 is illustrated and discussed here for simplicity, it should be understood that the described details and features can be applied for any number of neighbouring network nodes.

It is generally possible to transmit a reference signal in a comb-like manner, also referred to as comb-shaped transmission, so that the transmission is distributed over equally-spaced resource elements in the frequency domain. The term "comb" as used herein thus refers to a distribution pattern of resource elements in the frequency domain.

In another example, the first network node 200 may apply a different comb of resource elements in each OFDM symbol on the first numerology than the second network node 204, to achieve orthogonality when communicating the reference signal simultaneously. This means that the comb applied by the first network node 200 is different from the comb applied by the second network node 204. For example, one of the combs may comprise resource elements 0, 2, 4, 6, . . . and the other comb may comprise resource elements 1, 3, 5, 7, . . . meaning basically that no resource element in one comb coincide with any resource element in the other comb in the frequency domain. Orthogonality means that two or more transmissions do not substantially interfere with each other.

In further examples, the first network node 200 may determine the second numerology based on at least one of the following:

1) The current radio conditions for the wireless device 202, which determine the above-mentioned propagation properties. For example, if the radio conditions and resulting propagation properties are "bad", i.e. when wanted signals received by the wireless device 202 or by the first network node 200 are likely to be weak and/or disturbed, it may be favourable to use a robust numerology to improve signal reception, while better radio conditions would allow a less robust numerology. In this context, "robust numerology" implies a relatively low numerology with longer time between OFDM symbols than a higher numerology which is thus less robust than the lower numerology.

2) The current traffic load in the cell served by the first network node 200. For example, there may be an efficiency gain at high load to use the same numerology for a large set of users or devices. Furthermore, at high load it may also be more likely that a set of users or devices will "want" to use the same numerology.

3) Type of service currently used by the wireless device 202. It may thus be gainful to adapt or "scale" the numerology to reduce latency in a delay-sensitive service, which can also improve data rates for smaller data packets.

4) The current level of interference in the cell. For example, if it is desirable to employ interference coordination between cells using for example frequency planning, this is easier to do when the numerology for data is coordinated across the cells.

5) State of the wireless device 202 with respect to synchronization. In general, if the synchronization is poor it may be favorable or necessary to use a robust numerology, and vice versa. One special case is when contention based access is employed at relatively poor synchronization, where a more robust numerology, i.e. larger cyclic prefix, would not be as sensitive to timing errors as a less robust numerology would be. As indicated above, "robust numerology" indicates a numerology with relatively small subcarrier spacing and relatively long time between two successive OFDM symbols, which is e.g. less sensitive to delay spread and time errors in the signal reception.

In another example, the first network node 200 may configure the wireless device 202 with the first numerology in a device-specific configuration, e.g. using dedicated signalling to the wireless device 202. This means that the wireless device is configured with the first numerology individually, as opposed to being configured collectively together with other wireless devices.

In an alternative example, the first network node 200 may configure the wireless device 202 with the first numerology in a multi-device configuration, meaning that a set of multiple wireless devices are jointly configured with the same numerology for reference signal.

In another example, the first numerology may be signalled from the first network node 200 in a system broadcast, e.g. in case of the multi-device configuration of the previous example.

In another example, the second numerology may be signalled from the first network node 200 in Downlink Control Information, DCI, e.g. when the second numerology is selected and adapted specifically for the wireless device 202.

In another example, the DCI may comprise an indicator indicating whether the reference signal is useful for inter-node measurements or not. For example, the DCI may include a bit indicator that indicates if the reference signal is an inter-node measurement reference signal associated with the first numerology or if the reference signal is an intra-node measurement reference signal associated with the second numerology. Inter-node measurement means that the reference signal is transmitted in one cell and measured in another neighbouring cell, while intra-node measurement means that the reference signal is both transmitted and measured in the same cell.

In another example, the reference signal may be an uplink Sounding Reference Signal, SRS.

Figure 4:
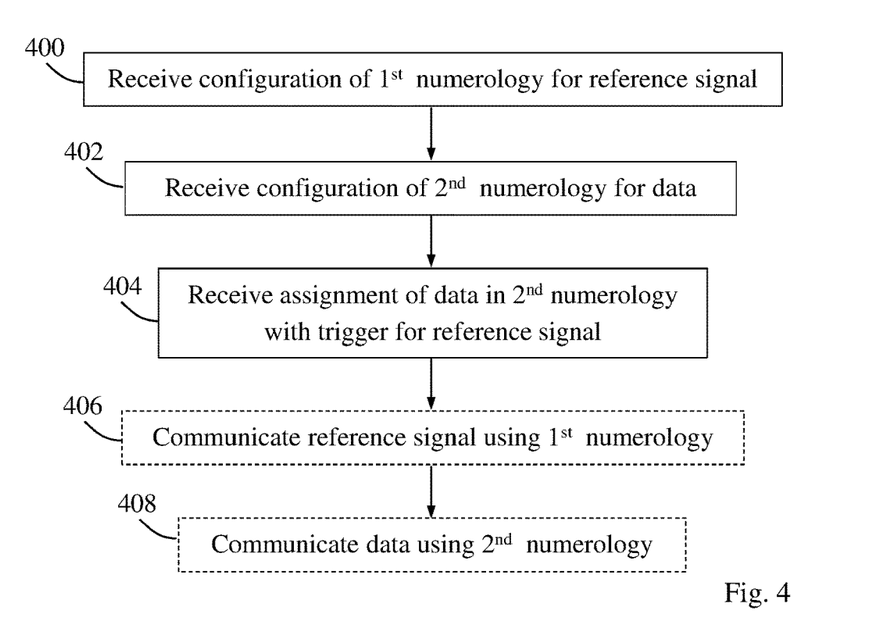
FIG. 4 is a flow chart illustrating a procedure in a wireless device, according to further possible embodiments.

Another example of how the solution may be employed in terms of actions performed by a wireless device such as the wireless device 202, is further illustrated by the flow chart in FIG. 4 which will now be described likewise with further reference to FIG. 2. FIG. 4 thus illustrates a procedure in the wireless device 202 for radio communication with a first network node 200. Some optional example embodiments that could be used in this procedure will also be described.

A first action 400 illustrates that the wireless device 202 receives from the first network node 200 a configuration of a first numerology for communication of a reference signal, the first numerology defining a first combination of subcarrier spacing and time between two successive Orthogonal Frequency-Division Multiplexing, OFDM, symbols, which corresponds to actions 2:2 and 304.

In another action 402, the wireless device 202 receives from the first network node 200 a configuration of a second numerology for communication of data between the first network node 200 and the wireless device 202, the second numerology defining a second combination of subcarrier spacing and time between two successive OFDM symbols. The above configurations of actions 400 and 402 may be received when signalled from the first network node 200, e.g. using any of the examples of configuring described above for FIG. 3.

In another action 404, the wireless device 202 receives from the first network node 200 an assignment of data in the second numerology, the assignment comprising a trigger for the reference signal.

In an optional action 406, the wireless device 202 may communicate the reference signal using the first numerology and may also communicate the data with the first network node 200 using the second numerology, as indicated by another optional action 408.

Some examples of how the above procedure of FIG. 4 may be implemented in practice will now be described. In one example, the wireless device 202 may receive configuration of the first numerology in a device-specific configuration. In an alternative example, the wireless device 202 may instead receive the configuration of the first numerology in a multi-device configuration. The terms device-specific configuration and multi-device configuration have been described above.

In another example, the wireless device 202 may receive the configuration of the first numerology in a system broadcast signalled from the first network node 200, e.g. when the configuration of the first numerology is received in a multi-device configuration as in the previous example.

In another example, the wireless device 202 may receive the configuration of the second numerology in Downlink Control Information, DCI, signalled from the first network node 200.

In another example, the DCI may comprise an indicator indicating whether the reference signal is useful for inter-node measurements or not, which has also been described above. In another example, the reference signal may be an uplink Sounding Reference Signal, SRS.

In another example, the wireless device 202 may be jointly connected to the first network node 200 for communication of data using the second numerology and to a second network node 204 for communication of data using a third numerology. This example illustrates how different numerologies may be employed in different network nodes for communication of data with one and the same wireless device.

Some further features, details and examples of how the embodiments herein may be realized in practice will now be described.

It has been described above how the embodiments herein can be used to perform inter-site measurements of a reference signal. The solution thus enables two or more base stations to match numerology for inter-site measurements. It is thus possible to use different numerologies for data and reference signals, while keeping the inter-site numerology compatible between base stations.

Figure 5:
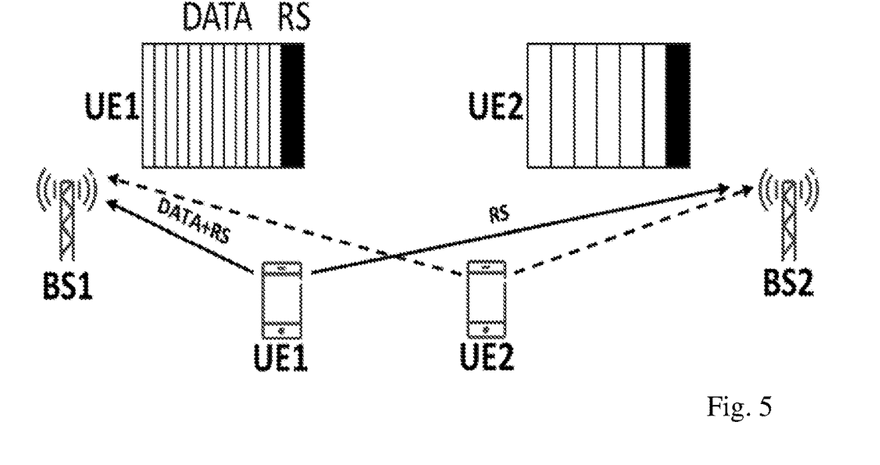
FIG. 5 is a communication scenario where different numerologies are used for data while keeping the same numerology for reference signal compatible between network nodes, according to further possible embodiments.

An example is shown in FIG. 5, were a first wireless device denoted UE1 is configured for data transmission to a first network node denoted BS1 with a 2×SC second numerology, as compared to a first numerology that is coordinated with a second network node denoted BS2 for inter-cell measurement, i.e. the UL-RS but not the data transmitted from UE1 is received in BS2. In BS2 a second wireless device denoted UE2 is configured for data transmission in 1×SC numerology that can jointly do an intra/inter-cell measurement on the same OFDM symbol in 1×SC numerology.

The configuration of the inter-site numerology may also be performed in some different ways. In some examples, the wireless device may be configured with the first numerology in a device-specific configuration. As described above, the first numerology may be configured in system broadcast. The second numerology may further be configured in the DCI. It has also been described above that the DCI may include a bit indicator that indicates if the reference signal RS is an inter-node measurement RS associated with the first numerology, or if the RS is an intra-node RS associated with the second numerology. Further, the UL-RS may be a SRS.

Figure 6:
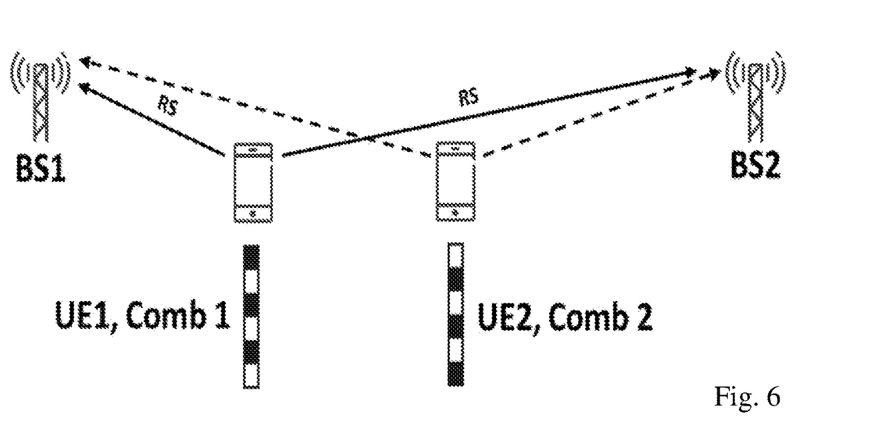
FIG. 6 is another communication scenario where different combs are used in two network nodes for orthogonalization, according to further possible embodiments.

Due to the usage of the same numerology, it is possible to use different standard orthogonalization techniques between the two sites. One such technique is to make use of different combs in the two sites, as depicted in FIG. 6. This implies that a reference signal from the first wireless device UE1 can be accurately measured in the second network node BS2, in particular in mobility and Comp scenarios when the UEs that needs to be measured in BS2 are the UEs with the strongest channel towards BS2. This means that if a UE is of interest, it will be close in received power to a UE served in BS2 and also strong in relation to other UEs (if any) in BS1 that are also using Comb 1, while the other UEs could then achieve orthogonalization by using Code Division Multiplexing, CDM.

The term Comp refers to Coordinated multipoint transmission and reception where two or more geographically separated network nodes communicate with a wireless device in a coordinated manner so that the overall quality for the user as well as the utilization of the network can be improved.

In the following, some use-cases 1-3 will be described, where the embodiments herein enable them to be performed at a lower cost than when not employing those embodiments.

Use-Case 1: Inter-Cell Mobility on SRS

In the inter-site mobility case, the UL-RS can be used to detect the UE and also perform channel estimation, for example, if the UL-RS is a SRS. This enables fast and seamless hand-over without employing any measurement gaps or whole sub-frames were all entities need to abide with the numerology compatible with both sites.

Use-Case 2: Inter-Cell Interference Coordination for SRS or on SRS

Figure 7:
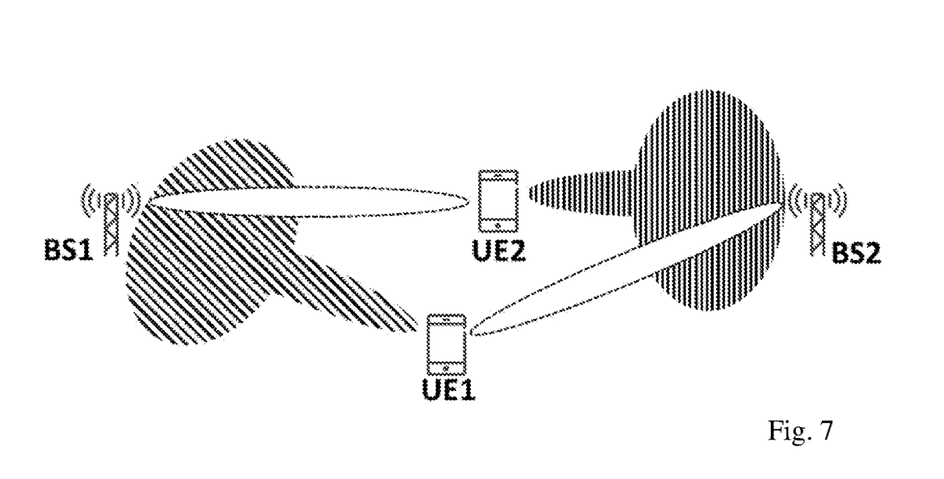
FIG. 7 is another communication scenario where Inter-cell coordination is employed by using channel estimates on Sounding Reference Signals, SRS, for zero-forcing, according to further possible embodiments.

When inter-site interference coordination between two cells is employed, two main scenarios are possible. One scenario could be when a neighboring network node measures the channel in order to avoid interference using so-called "zero-forcing", see FIG. 7 where each network node BS1, BS2 measures SRS transmitted by a "neighbor" UE served by another network node, in order to suppress the interference induced on said "neighbor" UE when serving its own UE.

In some scenarios, the matching numerology between the two cells enables orthogonalization by using for example different combs on SRS for the two cells.

Use-Case 3: CSI Estimation for Dual Connectivity

When a UE is connected to two network nodes by means of dual connectivity, the UE may be using one numerology for data transmission to a first network node, i.e. the above-described second numerology, and another numerology for data transmission to a second network node, referred to as a third numerology. The second network node may then schedule a UL data transmission for the third numerology and assigning SRS transmission using a first numerology wherein both first and second network node may determine UL CSI based on the reception of the SRS. The second network node will thus determine CSI for one numerology based on SRS transmitted in another numerology.

In another example, the embodiments herein may be used to obtain CSI for a third numerology intended for data transmission from the UE intended to be received by both network nodes. This example may be used for robustness reasons targeting data with high robustness and latency requirements such as URLLC (Ultra-Reliable Low-Latency Communication).

In yet another example, the embodiments herein may be used to transmit reference signals for downlink CSI (e.g., CSI-RS) wherein a network node may transmit e.g., CSI-RS in a single numerology to enable CSI estimation by UEs operating to communicate data in another numerology.

Figure 8:
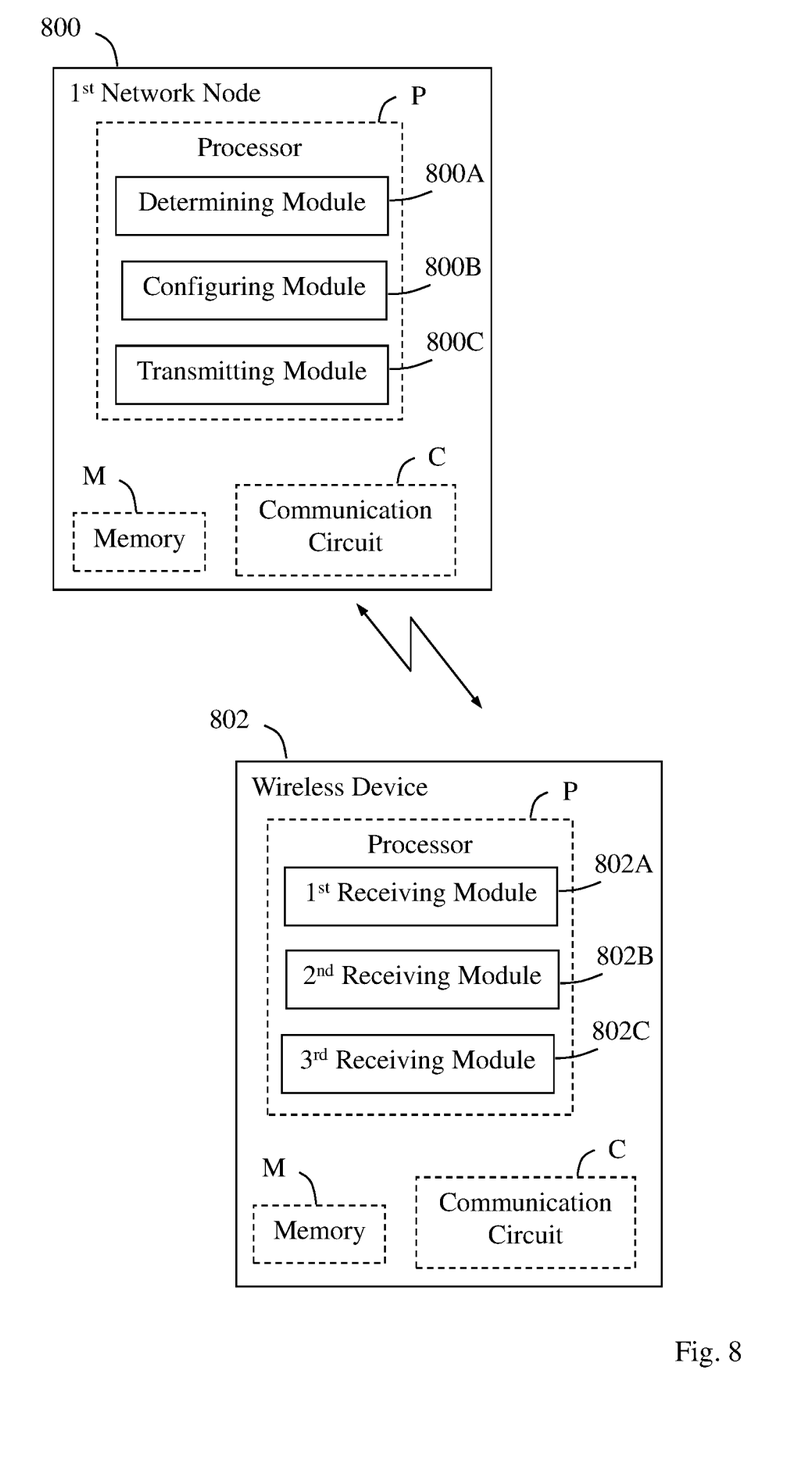
FIG. 8 is a block diagram illustrating a network node and a wireless device in more detail, according to further possible embodiments.

The block diagram in FIG. 8 illustrates a detailed but non-limiting example of how a network node 800 and a wireless device 802, respectively, may be structured to bring about the above-described solution and embodiments thereof. In this figure, the network node 800 and the wireless device 802 may be configured to operate according to any of the examples and embodiments of employing the solution as described herein, where appropriate. Each of the network node 800 and the wireless device 802 is shown to comprise a processor "P", a memory "M" and a communication circuit "C" with suitable equipment for transmitting and receiving radio signals in the manner described herein.

The communication circuit C in each of the network node 800 and the wireless device 802 thus comprises equipment configured for communication with each other using a suitable protocol for the communication depending on the implementation. The solution is however not limited to any specific types of radio signals or protocols.

The network node 800 is, e.g. by means of units, modules or the like, configured or arranged to perform at least some of the actions of the flow chart in FIG. 3 as follows. Further, the wireless device 802 is, e.g. by means of units, modules or the like, configured or arranged to perform at least some of the actions of the flow chart in FIG. 4 as follows.

The network node 800 is arranged for radio communication with a wireless device 802. The network node 800 is configured to determine a first numerology for communication of a reference signal with the wireless device 802, the first numerology defining a first combination of subcarrier spacing and time between two successive Orthogonal Frequency-Division Multiplexing, OFDM, symbols. This operation may be performed by a determining module 800A in the network node 800, as also illustrated in action 300. The determining module 800A could alternatively be named a logic module.

The network node 800 is also configured to determine a second numerology for communication of data between the first network node 800 and the wireless device 802, the second numerology defining a second combination of subcarrier spacing and time between two successive OFDM symbols. This operation may be performed by the determining module 800A, as also illustrated in action 302.

The network node 800 is further configured to configure the wireless device 802 with the first and second numerologies where the reference signal is associated with the first numerology. This operation may be performed by a configuring module 800B in the network node 800, as also illustrated in action 304.

The network node 800 is further configured to transmit an assignment of data in the second numerology to the wireless device 802, the assignment comprising a trigger for the reference signal. This operation may be performed by a transmitting module 800C in the network node 800 as also illustrated in action 306. The transmitting module 800C could alternatively be named an assigning module or device control module.

The wireless device 802 is arranged for radio communication with a first network node 800. The wireless device 802 is configured to receive from the first network node 800 a configuration of a first numerology for communication of a reference signal, the first numerology defining a first combination of subcarrier spacing and time between two successive Orthogonal Frequency-Division Multiplexing, OFDM, symbols. This operation may be performed by a first receiving module 802A in the wireless device 802 as illustrated in action 400.

The wireless device 802 is further configured to receive from the first network node 800 a configuration of a second numerology for communication of data between the first network node 800 and the wireless device 802, the second numerology defining a second combination of subcarrier spacing and time between two successive OFDM symbols.

This operation may be performed by a second receiving module 802B in the wireless device 802, as illustrated in action 402.

The wireless device 802 is further configured to receive from the first network node 800 an assignment of data in the second numerology, the assignment comprising a trigger for the reference signal. This operation may be performed by a third receiving module 802C in the wireless device 802, as illustrated in action 404. The first, second and third receiving modules 802A-C have logically been described as individual modules depending on their receiving functions, and they could alternatively be named obtaining modules or radio control modules. Further, two or all of the first, second and third receiving modules 802A-C may in practice be realized as a single receiving module.

It should be noted that FIG. 8 illustrates various functional modules in the network node 800 and the wireless device 802, respectively, and the skilled person is able to implement these functional modules in practice using suitable software and hardware equipment. Thus, the solution is generally not limited to the shown structures of the network node 800 and the wireless device 802, and the functional modules therein may be configured to operate according to any of the features, examples and embodiments described in this disclosure, where appropriate.

The functional modules 800A-C and 802A-C described above may be implemented in the network node 800 and the wireless device 802, respectively, by means of program modules of a respective computer program comprising code means which, when run by the processor P causes the network node 800 and the wireless device 802 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the network node 800 and the wireless device 802 in the form of a memory having a computer readable medium and being connected to the processor P. The computer program product or memory M in each of the network node 800 and the wireless device 802 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective network node 800 and wireless device 802.

The solution described herein may be implemented in each of the network node 800 and the wireless device 802 by a computer program comprising instructions which, when executed on at least one processor, cause the at least one processor to carry out the actions according to any of the above embodiments and examples, where appropriate. The solution may also be implemented at each of the network node 800 and the wireless device 802 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "network node", "wireless device", "numerology", "reference signal", "subcarrier spacing", "comb", "device-specific configuration" and "multi-device configuration" have been used in this disclosure, although any other corresponding entities, functions, and/or parameters could also be used having the features and characteristics described here. The solution may be implemented according to the appended claims.

The invention claimed is:

1. A wireless device configured for radio communication with a first network node, wherein the wireless device comprising:
    a communication circuit; and
    a processor and a memory, the memory containing instructions executable by the processor whereby the wireless device is configured to:
        receive from the first network node a configuration of a first numerology for communication of a reference signal, the first numerology defining a first combination of subcarrier spacing and time between two successive Orthogonal Frequency-Division Multiplexing, OFDM, symbols;
        receive from the first network node a configuration of a second numerology for communication of data between the first network node and the wireless device, the second numerology defining a second combination of subcarrier spacing and time between two successive OFDM symbols; and
        receive from the first network node an assignment of data in the second numerology, the assignment comprising a trigger for the reference signal.

2. The wireless device according to claim 1, wherein the wireless device is configured to:
    communicate the reference signal using the first numerology; and
    communicate the data with the first network node using the second numerology.

3. The wireless device according to claim 1, wherein the wireless device is configured to receive the configuration of the first numerology in a device-specific configuration.

4. The wireless device according to claim 1, wherein the wireless device is configured to receive the configuration of the first numerology in a multi-device configuration.

5. The wireless device according to claim 1, wherein the wireless device is configured to receive the configuration of the first numerology in a system broadcast signalled from the first network node.

6. The wireless device according to claim 1, wherein the wireless device is configured to receive the configuration of the second numerology in Downlink Control Information, DCI, signalled from the first network node.

7. The wireless device according to claim 6, wherein the DCI comprises an indicator indicating whether the reference signal is useful for inter-node measurements or not.

8. The wireless device according to claim 1, wherein the reference signal is an uplink Sounding Reference Signal, SRS.

9. The wireless device according to claim 1, wherein the wireless device is configured to be jointly connected to the first network node for communication of data using the second numerology and to a second network node for communication of data using a third numerology.

10. A method in a wireless device for radio communication with a first network node, the method comprising:
- receiving from the first network node a configuration of a first numerology for communication of a reference signal, the first numerology defining a first combination of subcarrier spacing and time between two successive Orthogonal Frequency-Division Multiplexing, OFDM, symbols;
- receiving from the first network node a configuration of a second numerology for communication of data between the first network node and the wireless device, the second numerology defining a second combination of subcarrier spacing and time between two successive OFDM symbols; and
- receiving from the first network node an assignment of data in the second numerology, the assignment comprising a trigger for the reference signal.

11. The method according to claim 10, the method further comprising:
- communicating the reference signal using the first numerology, and
- communicating the data with the first network node using the second numerology.

12. The method according to claim 10, wherein the wireless device receives the configuration of the first numerology in a device-specific configuration.

13. The method according to claim 10, wherein the wireless device receives the configuration of the first numerology in a system broadcast signalled from the first network node.

14. The method according to claim 10, wherein the wireless device receives the configuration of the second numerology in Downlink Control Information, DCI, signalled from the first network node.

15. The method according to claim 14, wherein the DCI comprises an indicator indicating whether the reference signal is useful for inter-node measurements or not.

16. The method according to claim 10, wherein the reference signal is an uplink Sounding Reference Signal, SRS.

17. A first network node arranged for radio communication with a wireless device, wherein the first network node comprises:
- a communication circuit; and
- a processor and a memory, the memory containing instructions executable by the processor whereby the first network node is configured to:
  - determine a first numerology for communication of a reference signal with the wireless device, the first numerology defining a first combination of subcarrier spacing and time between two successive Orthogonal Frequency-Division Multiplexing, OFDM, symbols;
  - determine a second numerology for communication of data between the first network node and the wireless device, the second numerology defining a second combination of subcarrier spacing and time between two successive OFDM symbols;
  - configure the wireless device with the first and second numerologies where the reference signal is associated with the first numerolog; and
  - transmit an assignment of data in the second numerology to the wireless device, the assignment comprising a trigger for the reference signal.

18. The first network node according to claim 17, wherein the first network node is configured to:
- communicate the reference signal using the first numerology; and
- communicate the data using the second numerology.

19. A method in a first network node for radio communication with a wireless device, the method comprising:
- determining a first numerology for communication of a reference signal with the wireless device, the first numerology defining a first combination of subcarrier spacing and time between two successive Orthogonal Frequency Division Multiplexing, OFDM, symbols;
- determining a second numerology for communication of data between the first network node and the wireless device, the second numerology defining a second combination of subcarrier spacing and time between two successive OFDM symbols;
- configuring the wireless device with the first and second numerologies where the reference signal is associated with the first numerology; and
- transmitting an assignment of data in the second numerology to the wireless device, the assignment comprising a trigger for the reference signal.

20. The method according to claim 19, the method further comprising
- communicating the reference signal using the first numerology; and
- communicating the data using the second numerology.

* * * * *